(12) United States Patent
Bianconi et al.

(10) Patent No.: US 7,171,189 B2
(45) Date of Patent: Jan. 30, 2007

(54) LOCATION BASED BILLING OF DATA SERVICES IN A MOBILE TELECOMMUNICATION SYSTEM

(75) Inventors: Richard J. Bianconi, Rowlett, TX (US); Michael K. Speas, Plano, TX (US); Albert G. Law, Jr., Richardson, TX (US); Laurent Teyssot, Paris (FR)

(73) Assignee: Nortel Networks Limited, St. Laurent (CA)

( * ) Notice: Subject to any disclaimer, the term of this patent is extended or adjusted under 35 U.S.C. 154(b) by 953 days.

(21) Appl. No.: 09/797,057

(22) Filed: Feb. 28, 2001

(65) Prior Publication Data
US 2002/0119766 A1    Aug. 29, 2002

(51) Int. Cl.
*H04M 11/00*    (2006.01)
(52) U.S. Cl. ............... 455/408; 455/406; 455/445; 455/426.1
(58) Field of Classification Search ........... 455/456, 455/3, 406, 405, 407, 414.3, 456.5, 414.2, 455/456.3
See application file for complete search history.

(56) References Cited

U.S. PATENT DOCUMENTS

| | | | | |
|---|---|---|---|---|
| 5,781,855 A | * | 7/1998 | Reuhkala et al. | 455/403 |
| 5,809,491 A | * | 9/1998 | Kayalioglu et al. | 706/45 |
| 5,812,545 A | * | 9/1998 | Liebowitz et al. | 370/337 |
| 5,873,030 A | * | 2/1999 | Mechling et al. | 455/408 |
| 6,055,430 A | * | 4/2000 | Cooper et al. | 455/445 |
| 6,424,840 B1 | * | 7/2002 | Fitch et al. | 455/456.1 |

\* cited by examiner

*Primary Examiner*—Temica Beamer
*Assistant Examiner*—Joy Contee
(74) *Attorney, Agent, or Firm*—Haynes and Boone, LLP

(57) ABSTRACT

A mobile telecommunication system supporting location based billing of data services is provided. The mobile telecommunication system includes a plurality of routing areas each having one or more base transceiver stations therein for providing a radio interface to a mobile terminal. A service node provides data services to the mobile terminal in two or more of the routing areas. The service node opens a mobility call detail record and a location container therein when the mobile terminal attaches to the mobile telecommunication system. The service node opens a packet data protocol call detail record and a traffic volume container when the mobile terminal activates a data session with the service node. The traffic volume container counts data service traffic volumes transferred to and from the mobile terminal. The location container is automatically closed when the mobile terminal roams from one routing area to a second routing area. The contents of any traffic volume containers are reported via a partial record to a node in the telecommunication system upon closure of the location container thus limiting, at any given moment, the traffic volume count in any traffic volume container to traffic volume transfers in a single routing area. Counts of subsequent data transfers are made in a zeroed traffic volume container. An operator of the mobile telecommunication system may then implement location based billing of data services by levying different fees for data services obtained by the mobile terminal in different routing areas.

35 Claims, 7 Drawing Sheets

LOCATION BASED BILLING OF DATA SERVICES IN A MOBILE TELECOMMUNICATION SYSTEM

TECHNICAL FIELD OF THE INVENTION

This invention relates to mobile telecommunication systems and, more particularly, to a system and method of implementing a location-based tariff on data traffic volumes transferred to and from a mobile terminal.

BACKGROUND OF THE INVENTION

The evolution of mobile telecommunication systems has brought about numerous offerings in the form of subscriber services. Early telecommunication systems, for example the advanced mobile phone system, were analog cellular systems and, consequently, were limited to providing basic voice services. However, modern telecommunication systems provide digital communications and are no longer confined to strictly voice services. Various data services are currently offered to cellular subscribers and include text messaging, and email as well as cellular Internet services presently being deployed. For example, general packet radio services (GPRS) were introduced in the Global System for Mobile communications (GSM) to more effectively utilize the radio spectrum for providing data oriented services. GPRS is a packet switched, rather than a circuit switched, data service and generally is more efficient than circuit switched data services because of deallocations of radio resources made during idle periods in a data communication session.

Various control nodes are typically distributed throughout the mobile telecommunication system. For example, mobile service switching centers (MSCs) are responsible for performing control and supervisory functions related to mobile connections to circuit switched networks, for example the public switched telephone network (PSTN). A gateway GPRS support node (GGSN) is typically accessed for connecting to a packet data network to access general packet radio services such as wireless Internet services. One or more Serving GPRS Support Nodes (SGSN) are included within the mobile telecommunication system for providing the mobile terminal access to the GPRS services, for example administering packet data protocol (PDP) sessions as well as performing managerial functions such as mobile terminal authentication, identification and IMEI interrogations. Thus, the GGSN provides an interface for the mobile telecommunications system to the data network while the SGSNs enable the mobile terminal to communicate with the GGSN and thus the packet data network over the traditional mobile telecommunication system infrastructures.

Voice and data mobile telecommunication services are provided over an air interface between the mobile terminal and the mobile telecommunication system. One or more base transceiver stations (BTSs) engage an active mobile terminal over an air interface. The BTSs are controlled and supervised by base station controllers (BSCs). The BSCs are, in turn, managed by MSCs. Each BSC can control multiple BTSs. Similarly, each MSC can manage multiple BSCs. Each BSC and the BTSs controlled thereby comprise a base station subsystem (BSS). The MSC and associated managerial hardware and software comprise a switching subsystem (SS).

Mobile terminal voice service subscriptions typically levy a fee for a given quantity of network access time. Additional tariffs may then be implemented when the subscriber exceeds the allotted access time. Often, the network operators assign a home area within the mobile telecommunications network in which the access time may be used. When a subscriber travels outside the home area, additional tariffs may be levied, typically in the form of higher tariffs per unit of access time.

Network operators are finding a growing demand for data services such as GPRS. Various usage-based tariff schemes have been implemented for applying toll charges based on the volume of data usage by a mobile terminal. Much like common cellular voice subscription services that charge a flat fee for a particular number of minutes of cellular access, data usage tariffs commonly have fee structures based on the amount of data transmitted to or from the mobile terminal. A mobility call detail record (M-CDR) is activated whenever a mobile terminal attaches to a mobile telecommunication system (MTS). Containers within the M-CDR monitor the location of the mobile terminal within the network. The M-CDR is typically maintained as long as the mobile terminal is attached to the MTS and remains in a specific coverage area of the network, for example a location area that is limited to the geographic service area of a single SGSN.

A Serving GPRS Support Node call detail record (S-CDR) is generally implemented for monitoring the traffic volume to and from a mobile terminal. A S-CDR is opened in a SGSN whenever an attached mobile terminal initiates a data session, for example a packet data protocol session. In an active session, the mobile terminal is able to transfer and receive payload data on a respective uplink and downlink with a packet data network, whereas when the mobile terminal is only attached, the mobile terminal is in a state designated as 'stand-by'. The S-CDR creates a traffic volume container that monitors the volume of data transfers made from the mobile terminal to the data network on the uplink and the volume of data transfers made to the mobile terminal on the downlink. When the mobile deactivates, or when the mobile terminal roams into a cell having data services provided by another SGSN, the S-CDR is closed. The S-CDR can then be retrieved from the SGSN by a charging gateway function (CGF) and processed to levy appropriate fees to the subscriber of the mobile terminal.

Network operators have devised various 'triggers' for enabling variations in the tariffs associated with data transfers to a mobile terminal. Tariff time change triggers can be executed in a SGSN for enabling variations in the billing fees associated with mobile data services according to, for example, the time of day or the day of week that the data transfers are made. A tariff time change trigger is typically invoked by a system clock in the SGSN and, upon execution thereof, causes any open traffic volume containers in a S-CDR to be closed. A new traffic volume container is opened within the S-CDR and the traffic volume is then monitored and counted in the newly opened traffic volume container. The traffic volume containers generally include timestamps, along with other information, for facilitating proper billing when the S-CDR is processed by the operator's billing system.

Partial record triggers may also be implemented to guard against loss of data, for example a failure in a SGSN that causes a loss of S-CDRs or M-CDRs, that would adversely effect the network operator's ability to implement an accurate billing to the mobile subscriber's effected by the lost S-CDRs or M-CDRs. A partial record S-CDR is created by clearing, or zeroing, the contents of the traffic volume containers in an open S-CDR after reporting these contents to an appropriate management node, for example a CGF.

Accumulation of further traffic volume counts are then made from the zeroed traffic volume container in the S-CDR. To facilitate accurate billing to a subscriber having traffic volume counts accumulated over multiple partial records, a record sequence number may be stored in a field of the S-CDR. Each time a partial record is made, the record sequence number in the S-CDR is incremented. The CGF, or similar facility, can later combine the partial records according to the record sequence numbers for providing an appropriate billing to the subscriber associated therewith. Common S-CDR partial record triggers include duration triggers, traffic volume triggers, and triggers based on the number of traffic volume containers in a S-CDR. Other S-CDR partial record triggers may be implemented by management intervention. Similar M-CDR partial record triggers may be likewise implemented.

Different mobile subscribers may have different preferences with regard to the quality of service provisioned by the SGSN when accessing a data network. Quality of Service (QoS) triggers have been implemented to allow variations in billing fees associated with the quality of service a mobile terminal is provided with when accessing a data network. For example, the network operator may impose a higher tariff when a mobile terminal accesses a data network on full-rate equipment rather than half-rate equipment. A QoS trigger facilitates quality of service tariff changes during an active session with data network by closing an open traffic volume container in a S-CDR when a QoS criteria threshold is met during the data session. For example, during an active session, full-rate channels in a BTS serving the mobile terminal may become unavailable. When a mobile terminal switches to a full-rate channel from a half-rate channel, a QoS trigger may close a current traffic volume container and open another traffic volume container. The network operator then may impose a higher tariff when a user accesses a data network over a full-rate channel.

Heretofore, however, a network operator has not had the ability to impose variations in tariffs assigned to data transfer volumes based on the location of a mobile terminal. As a mobile terminal roams throughout a network, any S-CDRs that are opened may maintain open traffic volume containers therein regardless of the geographic coverage area provided by a SGSN that the mobile terminal migrates to.

Therefore, it may be seen from the foregoing that a solution for location based billing of data services in a mobile telecommunication system is desired.

SUMMARY OF THE INVENTION

In accordance with an embodiment of the present invention, a mobile telecommunication system supporting location based billing of data services is provided. The mobile telecommunication system includes a plurality of routing areas each having one or more base transceiver stations therein for providing a radio interface to a mobile terminal. A service node provides data services to the mobile terminal in two or more of the routing areas. The service node opens a mobility call detail record and a location container therein when the mobile terminal attaches to the mobile telecommunication system. The service node opens a packet data protocol call detail record and a traffic volume container when the mobile terminal activates a data session with the service node. The traffic volume container counts data service traffic volumes transferred to and from the mobile terminal. The location container is automatically closed when the mobile terminal roams from one routing area to a second routing area. The contents of any traffic volume containers are reported via a partial record to a node in the telecommunication system upon closure of the location container thus limiting the traffic volume count, at any given moment, in any traffic volume container to traffic volume transfers in a single routing area. Counts of further data transfers are made in a zeroed traffic volume container. An operator of the mobile telecommunication system may then implement location based billing of data services by levying different fees for data services obtained by the mobile terminal in different routing areas.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 7 of the drawings, like numerals being used for like and corresponding parts of the various drawings.

Figure 1:
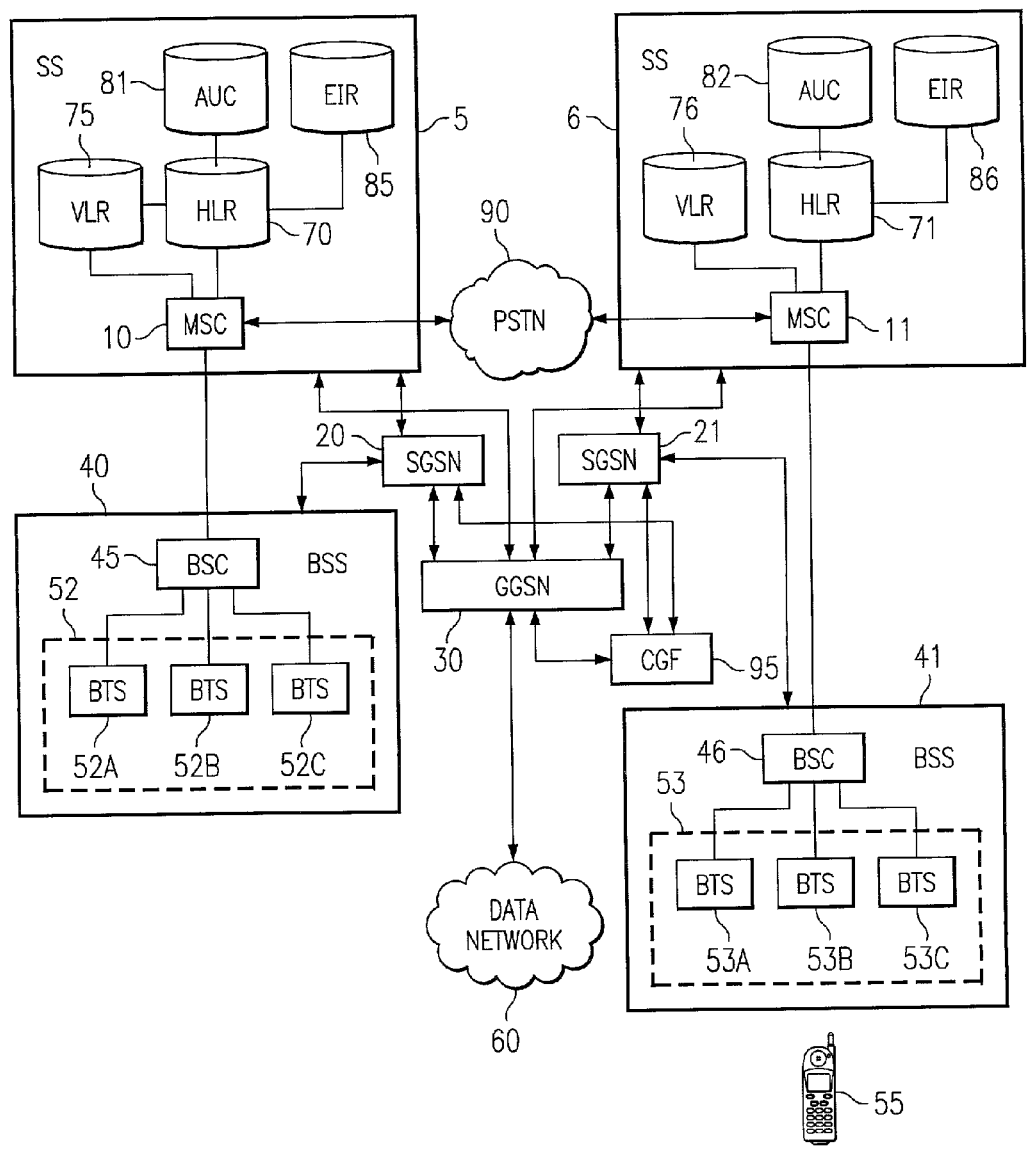
FIG. 1 is a mobile telecommunications system on which the present invention may be implemented for providing location based billing of mobile data services.

In FIG. 1, there is illustrated a mobile telecommunications system (MTS) 100 in which the present invention may be implemented. The exemplary mobile telecommunication system 100 is described according to the general infrastructure and nomenclature of the Global System for Mobile communications (GSM) standards although the present invention is not limited to application in such a system. Cellular telecommunication services are provided to one or more mobile terminals 55. The MTS 100 generally includes one or more switching systems (SSs) 5–6 and base station subsystems (BSSs) 40–41. The mobile terminal 55 can take on various forms other than a traditional cellular telephone, for example the mobile terminal 55 may be a laptop computer with a wireless modem capable of mobile terminations, a wireless personal digital assistant, etc. The mobile terminal 55 communicates directly with one or more base transceiver stations (BTSs) 52A–52C and 53A–53C included within respective BSSs 40–41. Each BSS, for example BSS 40, will typically include one or more geographically diverse BTSs, for example BTSs 52A–52C. A group of BTSs, for example one of a BTS group 52–53, is managed by a base station controller (BSC) 45–46, also referred to as a radio network controller, included within a respective BSS 40–41. Each BSS 40–41 communicates with, and is controlled by, a respective mobile services switching center (MSC) 10–11 included within a switching system 5–6. Each individual BTS 52A–52C and 53A–53C defines a radio cell operating on a set of radio channels thereby providing service to one or more mobile terminals (MTs) 55. Accordingly, each BSC 45–46 will have a number of cells corresponding to the respective number of BTSs 52A–52C and 53A–53C controlled thereby.

The switching system 5–6 contains a number of functional units implemented in various hardware and software. Generally, each SS 5–6 respectively contains a MSC 10–11, a Visitor Location Register (VLR) 75–76, a Home Location Register (HLR) 70–71, an Authentication Center 80–81, and an Equipment Identity Register 85–86. The mobile terminal 55 operable within the MTS 100 has a register designated as a home register. In the present illustration, and in the examples provided hereinbelow, the HLR 71 represents the home register of the mobile terminal 55. A HLR 71 is a database containing profiles of mobile terminals having the HLR 71 designated as the home register. The information contained within the MT's 55 profile in the HLR 71 includes various subscriber information, for example authentication parameters such as an international mobile station equipment identity (IMEI), an electronic serial number (ESN) and an authentication capability parameter as well as subscription service parameters such as an access point name (APN) that defines the services included in the subscription. Additionally, the MT's 55 HLR 71 profile contains data related to the current, or last known, location of the MT 55 within the MTS 100, for example a location area identifier. The location data contained within the HLR 71 associated with the MT 55 is dynamic in nature, that is it changes as the MT 55 moves throughout the MTS 100. It should be understood that each MSC 10–11 may, and typically does, control more than one BSC 45–46. In FIG. 1, only one respective BSC 45–46 is shown controlled by an MSC 10–11 to simplify discussion of the invention.

The VLR 75–76 is a database that contains information about all the MTs 55 currently being serviced by the MSC 10–11 associated therewith. For example, the VLR 76 will include information relating to each MT being serviced by MSC 11 and thus includes information associated with all MTs currently serviced by the BTSs 53A–53C that are controlled by the associated BSC 46. When a MT 55 enters a cell coverage area of a BTS controlled by another MSC, for example when MT 55 roams into the coverage area provided by BTS 52C, the VLR 75 of the SS 5 associated with the BTS 52C will interrogate the MT's 55 HLR 71 for subscriber information relating to the MT 55. This information is then transferred to the VLR 75. At the same time, the VLR 75 transmits location information to the HLR 71 indicating the MT's 55 new position. The HLR profile associated with the MT 55 is then updated to properly indicate the MT's 55 position. This location information is generally limited to a location area identifier. The information transmitted to the VLR 75 associated with a roaming MT 55 generally allows for call setups and processing for the MT 55 without further interrogation of the HLR 71, for example the MT's 55 authentication and subscription service parameters. Thus, when the MT 55 attempts to perform or receive a call, for example a data call, the SS 5 has the requisite information for performing the setup and switching functions to properly service the MT 55. Additionally, the VLR 75 will typically include more precise location information on a MT 55 than a HLR 71, for example the VLR 75 may contain a BSC identifier indicating the particular BSC servicing the MT 55.

Each SS 5–6 may also include an authentication center (AUC) 81–82 connected to the HLR 70–71 of the respective SS 5–6. The AUC 81–82 provides authentication parameters to the HLR 70–71 for authenticating a MT 55–56. The AUC 81–82 may also generate ciphering keys used for securing communications with a MT 55. Additionally, each SS 5–6 may also include an equipment identity register (EIR) 85–86 database that contains the international mobile station equipment identity used to uniquely identify the MT 55. The EIR 85–86 is used to validate the MT 55 requesting service in the MTS 100.

General packet radio services (GPRS) may be provided in the MTS 100. GPRS is a packet switched, rather than circuit switched, data service. For connecting to a packet data network 60 to access general packet radio services such as wireless Internet services, a gateway GPRS support node (GGSN) 30 is typically included in the MTS 100. One or more Serving GPRS Support Nodes (SGSN) 20–21 are included within the MTS 100 for providing the mobile terminal 55 access to the GPRS services, for example administering packet data protocol (PDP) sessions as well as performing managerial functions such as mobile terminal authentication, identification and IMEI interrogations. Thus, the GGSN 30 provides an interface for the mobile telecommunications system 100 to the packet data network 60 while the SGSNs 20–21 enable the mobile terminal 55 to communicate with the GGSN 30, and thus the packet data network 60, via the mobile telecommunication system 100 infrastructures.

A GPRS-capable MT 55 may access a packet data network by first performing an attach procedure. In general terms, the attach procedure is initiated by transmission of an Attach Request message to the SGSN servicing the MT. In the present illustrative example, the MT 55 is currently located within a cell provided by the BSS 41. The SGSN 21 is connected to the BSS 41 by a communication channel and thus is responsible for providing GPRS services to the MT 55. The SGSN 21 then identifies and authenticates the MT 55 after which an Update Location message is transmitted to the HLR 71. Authentication of the MT may include interrogation by the SGSN 21 of various modules in the SS 6 having the MT's home register therein, for example the SGSN may interrogate the AUC 82 or EIR 86. In response, the HLR 71 sends subscriber information to the SGSN 21 as well as an acknowledgement of the location update.

To engage in packet communications, an attached MT 55 must then perform an activation procedure, for example a PDP activation. Generally, an Activation Request message is transmitted from the MT 55 to the SGSN 21. The SGSN 21 then contacts the GGSN 30 and requests a PDP activation. The GGSN 30 maintains a record of the address of the SGSN 21 servicing the MT 55 so that packet data from the data network 60 can be appropriately routed to the MT 55. The GGSN 30 will then update the SGSN address whenever the MT roams into a cell provided by a BTS serviced by another SGSN, for example when the MT 55 roams into the cell provided by BTS 52C serviced by SGSN 20. A billing node, for example a charging gateway function 95, is included for receiving usage statistics, for example usage data in the form of M–CDRs and S–CDRs, on individual mobile subscribers to facilitate appropriate billing thereof.

Figure 2:
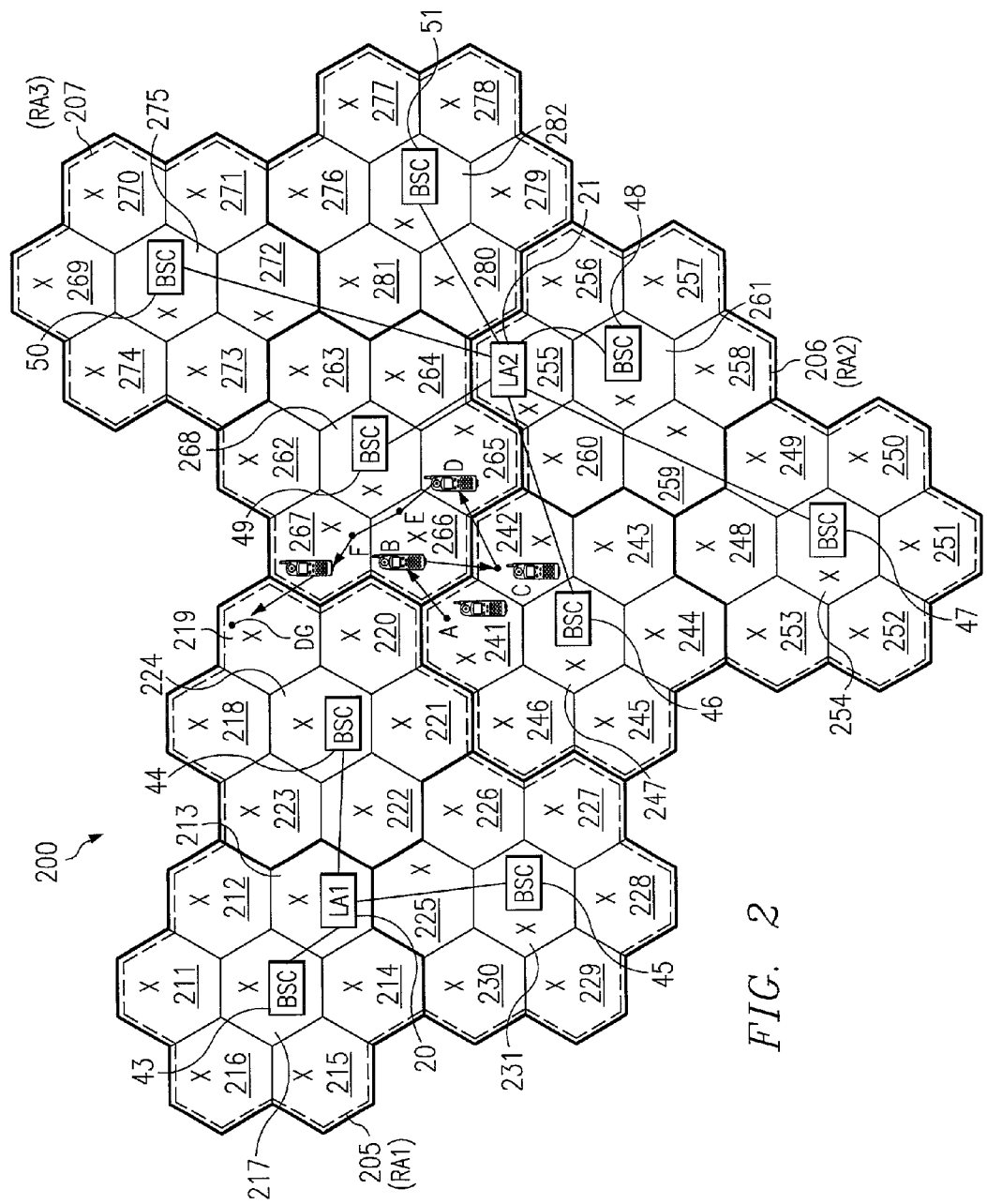
FIG. 2 is an exemplary mobile telecommunication network including location areas and routing areas on which the present invention may provide location based billing of data services.

In FIG. 2, there is illustrated an exemplary mobile telecommunication system 200 on which the present invention may be implemented. In this illustrative example, radio cells are illustrated with hexagons indicating the approximate shape of the geographic coverage provided by respective BTSs (each designated with an X). As aforedescribed, SGSNs 20 and 21 provide GPRS to a MT 55 via one or more BTSs in communication therewith. To simplify discussion, only the SGSNs 20–21 and the respective BSCs 43–45 and 46–51 are illustrated in FIG. 2. It is understood that each of the SGSNs 20–21 operates in conjunction with a respective SS 5 and 6 as well as a GGSN 30 for providing data services with a packet data network 60 as generally described with reference to FIG. 1. Each SGSN 20–21 provides GPRS service through one or more BSSs having a respective BSC 43–45 and 46–51. The BSCs 43–51 in turn, control one or more BTSs and provide GPRS services to a MT 55 over a radio interface. In the present example, the SGSN 20 provides GPRS service via BSCs 43–45, that is in cells 211–231 and the SGSN 21 provides GPRS service via BSCs 46–51, that is in cells 241–282.

A collection of cells serviced by one or more MSCs 10–11 may cover a vast geographic area. A geographic area having mobile telecommunication services provided therein may be divided into smaller subregions each referred to as a location area (LA). For example, SGSN 20 is located within a location area defined by the cells supported by BSCs 43–45, that is the location area of the SGSN 20 is defined by the cells 211–231. The SGSN 21 has a location area defined by the cells supported by BSCs 46–51, that is the location area of the SGSN 21 is defined by the cells 241–282. It is understood that more than one location area may be included within the area having GPRS services provided by a SGSN. A single location area LA1 and LA2 is illustrated in association with a respective SGSN 20 and 21 for simplicity of discussion only. Each location area has a unique location area identifier, for example LA1 associated with the SGSN 20 and LA2 associated with the SGSN 21. A location area may be divided into smaller geographic segments referred to as routing areas (each illustratively designated with dashed lines). In the present example, the location area 1 (LA1) has a single routing area designated by the routing area identifier RA1 and the location area 2 (LA2) includes two routing areas denoted by the routing area identifiers RA2 and RA3. RA2 is defined by the cell coverage area provided by BSCs 46–48, that is RA2 includes the cells 241–261. RA3 is defined by the cell coverage area provided by BSCs 49–51, that is RA3 includes the cells 262–282. It is understood that a location area may, and often does, have more than two routing areas. Tracking a MT's 55 location by routing areas enables more efficient use of the radio spectrum available in the MTS 200. For example, when a MT 55 is to be located, paging signals must be sent within the MTS 200. Typically, these paging signals are broadcast in the last known routing area in which the MT 55 was known to be located. If the MT 55 is not located by a paging of the routing area, the paging is then carried out over a different or larger geographic area, for example a location area. By initially limiting the paging signals to a single, or limited number of routing areas, unnecessary paging in other routing areas can be avoided.

The routing area identifier is typically stored in the SGSN currently providing GPRS services to the MT 55 and is updated anytime the MT 55 roams into a different routing area. For example, the MT 55 serviced by SGSN 21 and located in the cell 241 may roam into the cell 266, thus roaming from the routing area RA2 to the routing area RA3. Because both RA2 and RA3 are included in a common location area, namely LA2, roaming from RA2 to RA3, or vice versa, will result in what is referred to as an intra-SGSN routing area update (RAU) because both RA2 and RA3 are serviced by the same SGSN 21. An inter-SGSN routing area update is performed when a mobile terminal 55 roams from a routing area serviced by one SGSN into a routing area serviced by another SGSN. For example, an inter-SGSN routing area update would be performed if MT 55 roamed from cell 241 (serviced by SGSN 21) of RA2 to cell 221 (serviced by SGSN 20) of RA1.

Figure 3:
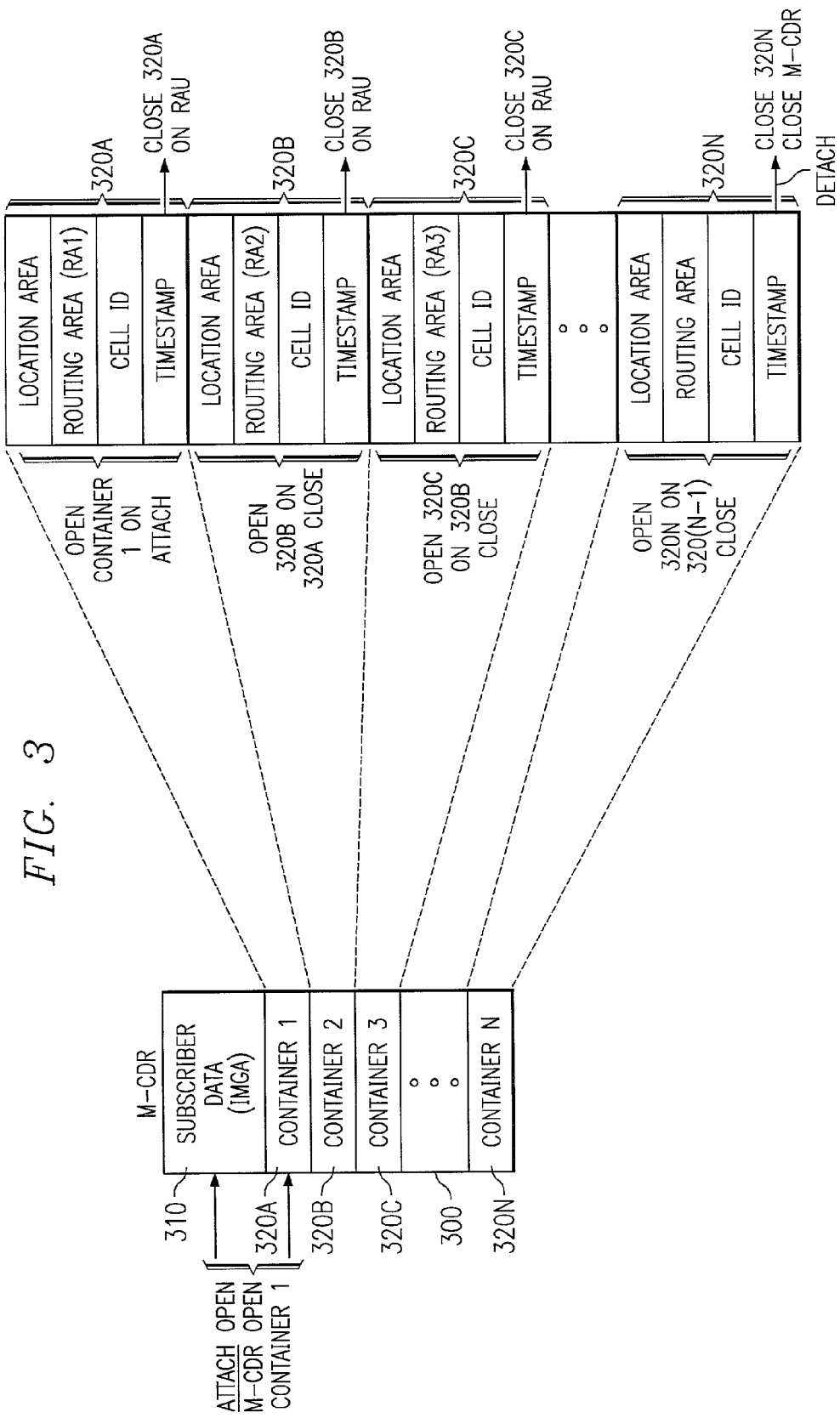
FIG. 3 is a mobility call detail record for monitoring and recording the location of a mobile terminal in a mobile telecommunication system.

When a MT 55 first attaches with the MTS 100, a mobility call detail record (M-CDR) 300, as illustrated in FIG. 3, is opened in the SGSN 21. The M-CDR 300 typically includes subscriber information including the international mobile station equipment identity (IMEI) or other identifying information. The M-CDR 300 also stores a routing area identifier indicating the current routing area in which the MT 55 is located. Whenever the MT 55 moves into another routing area, the M-CDR 300 is updated with an identifier of the new routing area. Timestamp information may be included within the M-CDR 300 indicating attach times to the MTS 100 as well as times of routing area migration. The M-CDR 300 is closed whenever the MT 55 leaves the coverage area of a SGSN 21 or detaches from the MTS 100. When the MT 55 roams into a coverage area provided by another SGSN, for example SGSN 20, a new M-CDR 300 is created in the SGSN 20 into which the MT 55 has roamed and the old M-CDR 300 in the SGSN 21 is closed.

Generally, the M-CDR 300 will have one or more containers 320A–320N (also referred to herein as "location containers") therein corresponding to the routing areas that the MT 55 has been located in while attached to the MTS 100. For example, the MT 55 located in the cell 241 may attach to the MTS 100 through the SGSN 21. A M-CDR 300 is opened in the SGSN 21 upon completion of a successful attach operation. A subscriber identifier component 310 stores, for example, the IMEI of the MT 55 to uniquely identify the MT 55. A single container 320A is also created when the MT 55 successfully attaches to the MTS 100. The container 320A can include information such as location area identification, routing area identification, cell identification and a timestamp indicating the time of attachment. When the MT 55 migrates into another routing area, a second container 320B is added to the M-CDR 300. The location area identification, routing area identification and a cell identification as well as a timestamp indicating the time the MT 55 roamed into the second routing area are all recorded in the second container. Additional containers 320C–320N are added to the M-CDR 300 each time the MT 55 moves into another routing area. The M-CDR 300 is closed when the MT 55 detaches from the MTS 100, for example when the MT 55 powers off or roams into a location area provided by another SGSN.

Figure 4:
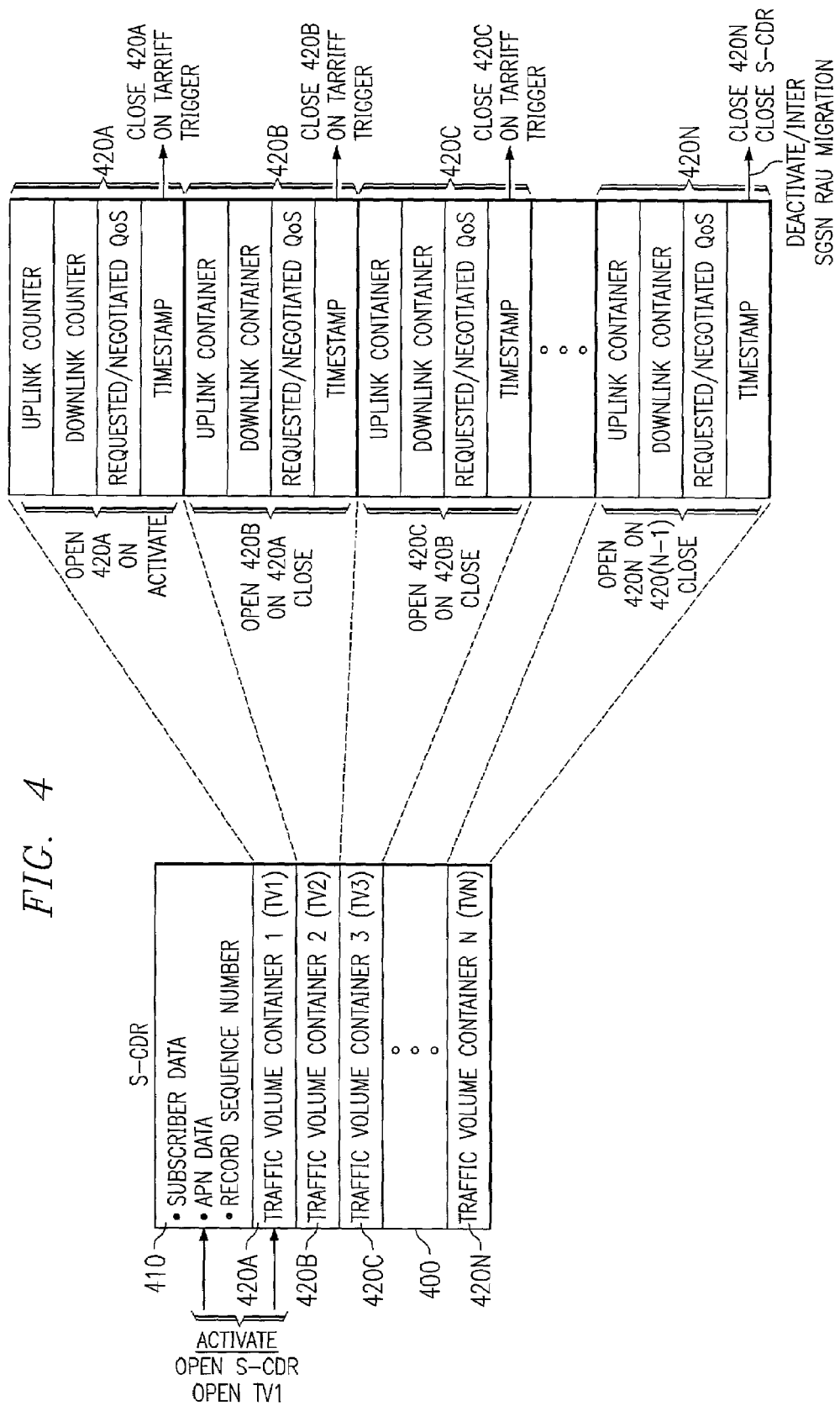
FIG. 4 is a SGSN call detail record for counting data traffic volume delivered to and from a mobile terminal in a mobile telecommunication system.

With reference to FIG. 4, there is illustrated a SGSN call detail record (S-CDR) 400 that is created in a SGSN 21 whenever a MT 55 activation is successfully performed therewith, for example upon a packet data protocol activation with a packet data network 60. A S-CDR 400 is responsible for counting uplink and downlink traffic volume from and to the MT 55. This data can then be used to impose usage tariffs on the MT 55 subscriber account. A S-CDR 400 includes a subscriber identifier component 410 that stores, for example, the IMEI of the MT 55. The subscriber identifier component 410 preferably includes an access point name (APN) that indicates the desired services as requested in the subscribers profile. The APN is obtained from the SGSN 21 during the interrogation of the subscriber's HLR 71 in the attach request. A record sequence number is also stored within the S-CDR 400, for example within the subscriber identifier component 410, for enabling partial records of the S-CDR to be maintained, as described hereinabove. When the S-CDR 400 is opened, a traffic volume (TV) container 420A is opened therein for counting the data traffic volume to and from the MT 55. The S-CDR can include one or more traffic volume containers 420A–420N each preferably including an uplink counter for recording the uplink traffic volume transmitted from the MT 55 to the packet data network 60 and a downlink counter for recording the traffic volume received by the MT 55 from the packet data network 60. Other data, for example a requested/negotiated quality of service indicator, may be included within each traffic volume container 420A–420N as well. A timestamp is preferably included within each traffic volume container 420A–420N. Various tariff triggers are responsible for closing an open traffic volume container. Upon closing of a traffic volume container in response to a tariff trigger, a new traffic volume container is automatically opened. The S-CDR 400, as well as an open traffic volume container, is closed when the MT 55 deactivates or performs an inter-SGSN RAU. Thus, each traffic volume container 420A–420N has two general states: open and closed. A traffic volume count can be accumulated by incrementing, in response to data transmissions through the SGSN 21, the traffic volume count in an open traffic volume container. When the traffic volume container 420A–420N is closed, the traffic volume count therein then becomes fixed. Additionally, partial records of the S-CDR 400 can be created by reading the contents of one or more traffic volume containers 420A–420N, along with the subscriber identifier component 410 data, and reporting this information in the form of a partial record to an appropriate node in the telecommunication system 200. One or more of the traffic volume containers may be reset, or zeroed, during or subsequent to generation of the partial record. By implementing partial records of a S-CDR 400, traffic volume counts can be aggregately formed over multiple partial records of a S-CDR 400 rather than a single record of a S-CDR 400. The present invention provides a novel partial record tariff trigger for limiting any traffic volume counts accumulated in a traffic volume container 420A–420N at any given time to a single routing area of the MTS 200.

Figure 5:
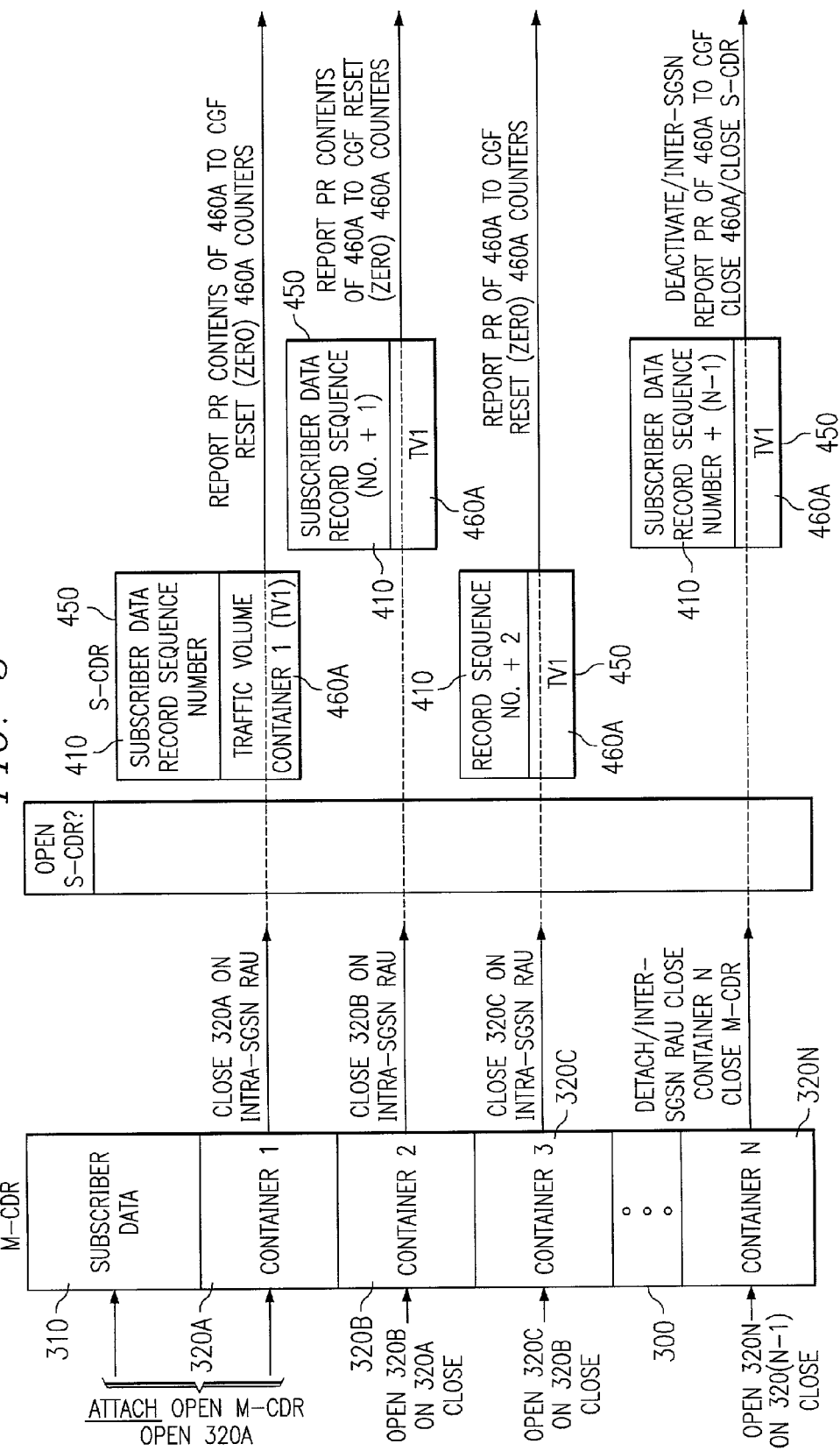
FIG. 5 is an embodiment of the present invention linking a mobility call detail record with a SGSN call detail record for providing location based billing of data services in a mobile telecommunication system.

The present invention enables the traffic volume counts in a traffic volume container of a S-CDR 450 to be limited, at a given moment, to only one routing area by linking a M-CDR 300 with a S-CDR 450. As illustrated in FIG. 5, the traffic volume containers are advantageously dependent on the routing area from which the packet data services are accessed according to an embodiment of the invention. As described hereinabove, the M-CDR 300 is opened when the MT 55 attaches to the MTS 100 through a SGSN 21 and is maintained in an open state until the MT 55 detaches from the MTS 100. A S-CDR 450, or multiple S-CDRs, may be opened during the duration that the M-CDR 300 is open. When the M-CDR 300 is opened, a first container 320A is created therein as described above and remains open until either an intra- or inter-SGSN RAU occurs or the MT 55 detaches from the MTS 100, the later of which also causes closing of the M-CDR 300 as well. A second container 320B is opened in the event that an intra-SGSN RAU occurs. Each subsequent intra-SGSN RAU results in closing the currently opened container and opening another container. When an inter-SGSN RAU occurs (or a MT 55 detach or power-off), the currently opened container 320N in the M-CDR 300 is closed, as well as the M-CDR 300 itself.

When the MT 55 is attached to the MTS 100 through a SGSN 21 and successfully enters an active data session with the packet data network 60, a S-CDR 450 is opened and a first traffic volume container 460A is opened therein for counting and recording traffic volumes between the MT 55 and the packet data network 60. The S-CDR 450 includes a subscriber identifier component and preferably includes a record sequence number. The open traffic volume container 460A may be closed by a variety of tariff triggers whereupon a subsequent traffic volume container (not shown) is opened within the S-CDR 450. Partial record tariff triggers may be executed to cause the contents of any traffic volume containers in the S-CDR 450 to be reported to a CGF 95 followed by resetting, or zeroing, of the traffic volume containers. By linking the M-CDR 300 with an open S-CDR 450 according to the present invention, a novel partial record tariff trigger facilitating location based billing is provided by causing an open traffic volume container to be reset upon closure of a container within the M-CDR 300, and thus upon an intra-SGSN RAU. For example, when container 320A is closed as a result of an intra-SGSN, an evaluation is made in the servicing SGSN of whether a S-CDR is open and, if so, generates and transmits a partial record (PR) report to an appropriate node, for example the CGF 95 (FIG. 1). The contents of the traffic volume container 460A are then reset to zero and subsequent traffic volume counts are made therefrom. After each traffic volume container reset, the record sequence number of the S-CDR 450 is preferably incremented. Likewise, each container closing, for example closure of containers 320B and 320C, in the M-CDR 300 resulting from an intra-SGSN RAU results in a closing of the traffic volume container 460A that is open at the time of the intra-SGSN RAU. Accordingly, any traffic volume containers in a S-CDR 450 linked to a M-CDR 300 will only contain traffic volume counts obtained from a MT 55 data session within a single routing area. Traffic volume counts from more than one routing area accumulated in one or more traffic volume containers can thus have different tariffs applied thereto because the traffic volume counts from different routing areas will be maintained in different partial records.

Figure 6:
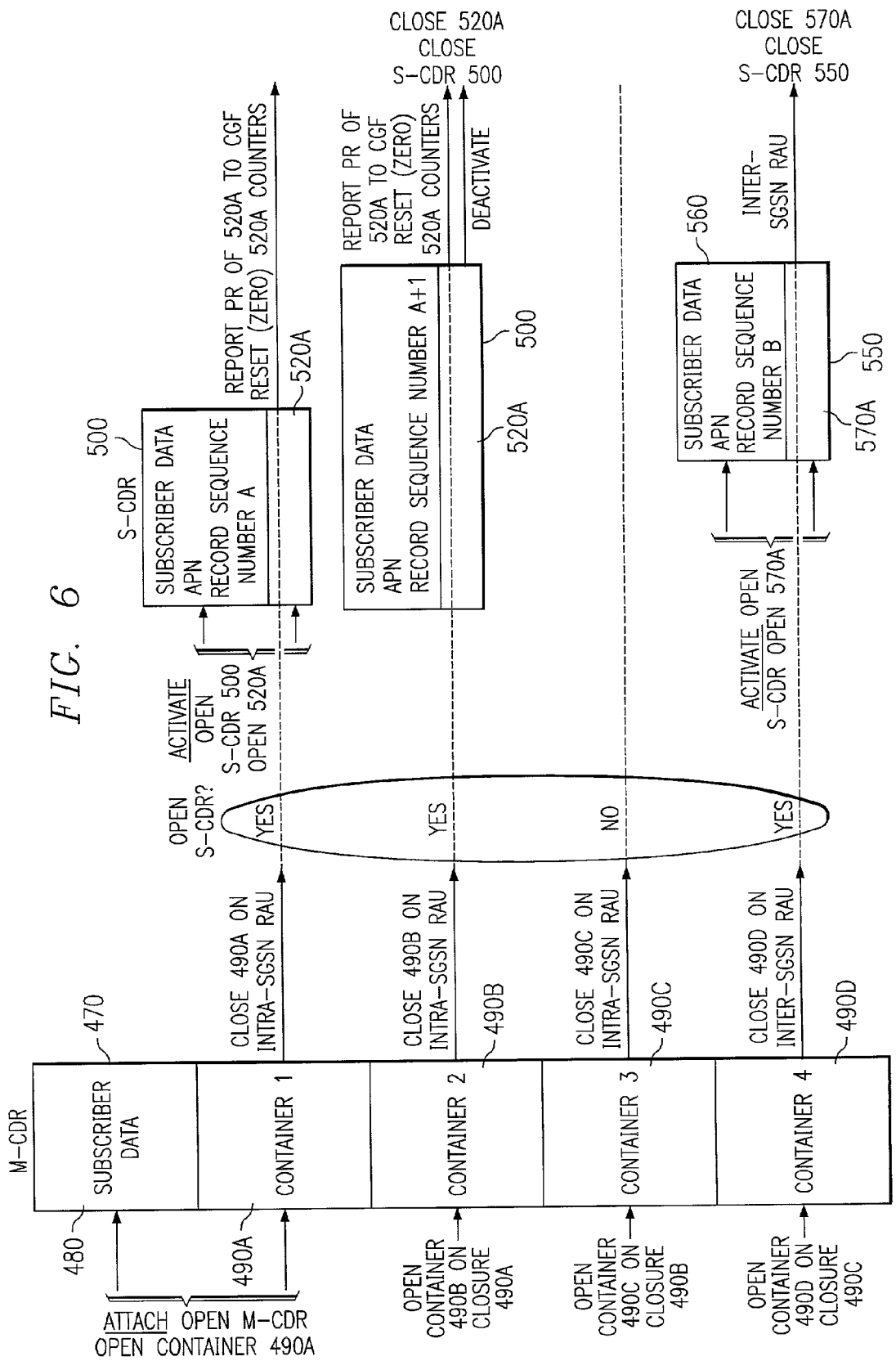
FIG. 6 is an exemplary mobility call detail record and a SGSN call detail record of a mobile terminal roaming in a telecommunication system.
Figure 7:
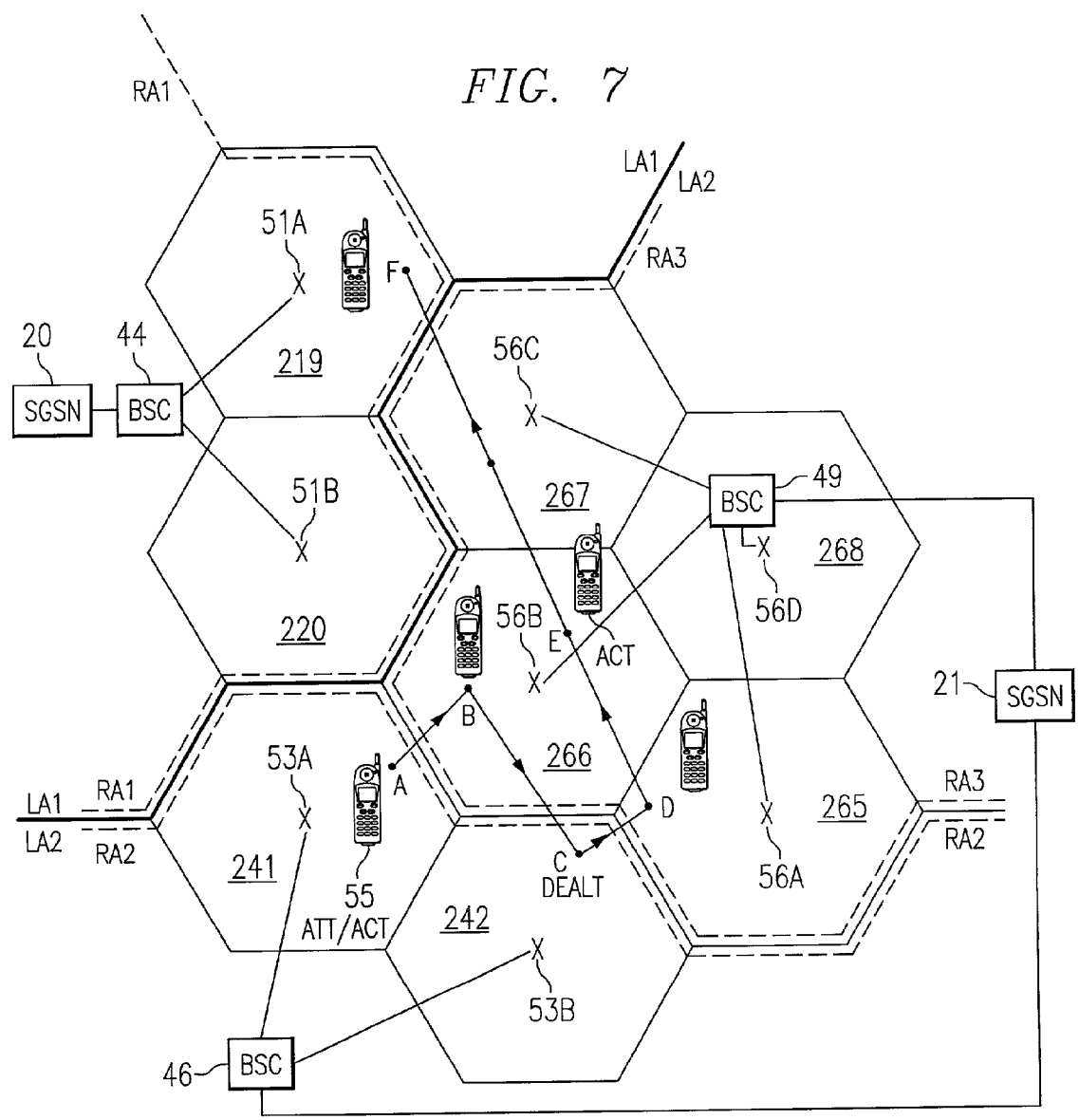
FIG. 7 is a portion of telecommunication system having a roaming mobile terminal therein associated with the mobility call detail record and the SGSN data record of FIG. 6.

The present invention may be more clearly understood with reference now to FIGS. 6 and 7. FIG. 7 shows a portion of the network 200 previously described with reference to FIG. 2. Specifically, the cells 219 and 220 (provided by respective BTSs 51A and 51B) in the routing area 1, the cells 241 and 242 (provided by respective BTSs 53A and 53B) of the routing area 2, and the cells 265–268 (provided by respective BTSs 56A–56D) of the routing area 3 are shown. BSCs 44, 46 and 49 control respective groups of BTSs 51A–51B, 53A–53B and 56A–56D. GPRS is provided throughout the routing area 1 by the SGSN 20 connected to the BSC 44. The SGSN 21 enables GPRS to be provided in the cells of both routing areas 2 and 3 and is accordingly connected to both BSCs 46 and 49. As described with reference to FIG. 2, the location area 2 (LA2) includes both routing areas 2 (RA2) and 3 (RA3) while the location area 1 only includes the routing area 1 (RA1).

In the present illustrative example, a MT 55 is first located in cell 241 of the RA2. The MT 55 makes an attach request by transmitting an Attach Request message to the SGSN 21 pursuant to obtaining GPRS therefrom as generally described hereinabove. Upon a successful attach to the MTS 100, a M-CDR 470 is opened in the SGSN 21. A subscriber identifier component 480 of the M-CDR 470 stores an identity, for example an IMEI, of the MT 55 and a first container 490A is opened. The container 490A can include location information such as location area identification, routing area identification, cell identification and a timestamp indicating the time of attachment. As described hereinabove with reference to FIG. 3, the container 490A of the M-CDR 480 persists until the MT 55 performs an intra-SGSN RAU or an inter-SGSN RAU (or until the MT 55 powers off). An intra-SGSN RAU results in the current container 490A closing and a subsequent second container 490B being opened. Both the open container and the M-CDR 480 itself are closed in the event of an inter-SGSN RAU.

During the time that the M-CDR 470 is open, that is while the MT 55 is attached to the MTS 100, an Activation Request can be made by the MT 55 to the servicing SGSN 21. An Activation Request message is transmitted from the MT 55 to the SGSN 21 and a request for a PDP activation, for example, is made with a GGSN 30 (FIG. 1). Upon completion of an activation operation, a S-CDR 500 is opened in the SGSN 21. The S-CDR 500 includes a subscriber identifier component 510 that stores, for example, the IMEI of the MT 55. The subscriber identifier component 510 also preferably includes an access point name (APN) of the MT 55 as well as a record sequence number. When the S-CDR 500 is opened, a traffic volume container 520A is opened therein for counting the data traffic volume to and from the MT 55. The traffic volume container 520A preferably includes an uplink counter for recording the uplink traffic volume transmitted from the MT 55 to the packet data network 60 and a downlink counter for recording the traffic volume received by the MT 55 from the packet data network 60. A timestamp is preferably included within the traffic volume container 520A.

In the present illustrative example, the MT 55 first performs an attach (ATT) while located in cell 241 (position A) of the routing area 2 causing a M-CDR 470 to be opened in the SGSN 21, the M-CDR 470 having a container 490A opened therein. Subsequently, the MT 55 performs an activation (ACT) while still located in cell 241 thus causing a S-CDR 500 to be opened and, consequently, a traffic volume container 520A to be opened within the S-CDR 500. Thus, the MT 55 will have a M-CDR 470 and a S-CDR 500 both opened in the SGSN 21 providing GPRS services thereto.

In the ongoing example, the MT 55 traverses a path (A-B-C-D-E-F) through cells 241, 266, 242, 265, 266, 267 and 219. Thus, various routing area updates will be performed as the MT 55 migrates across routing area borders. As the MT 55 migrates from cell 241 to cell 266 (A-B), thus performing an intra-SGSN RAU (traversing the border of routing area 2 into routing area 3 while staying within location area 2), the container 490A of the M-CDR 470 is closed according to typical M-CDR procedures. Because the MT 55 is still attached (ATT), the M-CDR 470 persists and opens a new container 490B. According to the invention, as the container 490A is closed, the SGSN 21 evaluates whether the MT 55 has an open S-CDR. In the present example, the S-CDR 500 is open with a current traffic volume container 520A opened therein. Accordingly, a partial record of the S-CDR, the partial record preferably including the count (or counts) stored in the traffic volume container 520A, is generated and transmitted to an appropriate node in the telecommunication network, for example the CGF 95 (FIG. 1). The contents of the traffic volume container 520A are then reset to zero and subsequent traffic volume counts are made therefrom. The record sequence number of the S-CDR 500 is preferably incremented upon zeroing of the traffic volume container 520A. Because the open container 490A of a M-CDR 470 is automatically closed upon an intra-SGSN routing area update, utilizing the closing of a M-CDR 470 as a partial record trigger for a S-CDR disallows traffic volume counts from multiple routing areas from accumulating together in a single traffic volume container. Thus, by triggering the partial record of the traffic volume container 520A with the closing of a container 490A in the M-CDR 470, the partial record of the S-CDR generated upon closure of the M-CDR container 490 will only have traffic volume counts obtained from the routing area 2 (RA2).

The MT 55 next traverses the path (B-C) from cell 266 of routing area 3 (RA3) to the cell 242 of routing area 2 (RA2). Traversing the routing area borders again causes an intra-SGSN RAU. The intra-SGSN RAU triggers closure of the open container 490B of the M-CDR 470 and a new container 490C to be opened. According to the invention, the SGSN 21 evaluates whether the MT 55 has an open S-CDR. Upon confirmation that the S-CDR 500 is open, the SGSN 21 generates a partial record of the S-CDR 500 that includes one or more traffic volume counts recorded in the traffic volume container. The partial record is then reported to an appropriate node in the telecommunication network and the counters in the traffic volume container are again reset. Thus, a partial record generated upon closure of the M-CDR container 490B will only contain traffic volume counts accumulated while the mobile terminal was located in the routing area 3 (RA3). Upon generation of the partial record, the record sequence number in the S-CDR 500 is preferably incremented.

In the present example, the MT 55 deactivates (DEACT) the packet data session when located in cell 242, for example by closing an Internet session with the packet data network 60. The open traffic volume container 520A is then automatically closed as is the S-CDR 500 according to typical S-CDR procedures. In the present example, the MT 55 does not break its attachment to the MTS 100, however. Thus, the M-CDR 470 remains open.

The MT 55 next traverses the path (C-D) from cell 242 of the routing area 2 (RA2) to the cell 265 of routing area 3 (RA3). Traversing the routing area borders again causes an intra-SGSN RAU. The intra-SGSN RAU causes the open container 490C of the M-CDR 470 to be automatically closed and a new container 490D to be opened. According to the invention, the SGSN 21 evaluates whether the MT 55 has an open S-CDR. The MT 55 has previously deactivated the packet data session and, thus, an evaluation for an open S-CDR reveals that no S-CDRs for the MT 55 are open.

The MT 55 then roams (D-E) from the cell 265 to the cell 266. At this point, the MT 55 re-establishes the packet data session by performing another data session activation (ACT). A new S-CDR 550 is accordingly opened and includes an open traffic volume container 570A according to typical S-CDR procedures. Thereafter, the MT 55 roams (E-F) from cell 266 through the cell 267 (of RA3) and into cell 219 (of RA1). Upon traversing the cell border of cell 267 and 219, an inter-SGSN RAU is invoked because RA3 is included within the LA2 serviced by SGSN 21 while RA1 is included within the LA1 serviced by SGSN 20. Accordingly, the container 490D is automatically closed, as well as the M-CDR 470 itself. Likewise, the traffic volume container 570A of the S-CDR 550, as well as the S-CDR 550, is closed. The SGSN 20 servicing the routing area (RA1) into which the MT 55 has roamed may then open a M-CDR and S-CDR for performing mobility call detail processing and traffic volume recording to and from the MT 55 within the LA1. The M-CDR 470 and S-CDRs 500 and 550 can then be later retrieved by a CGF 95 to impose system usage fees to the MT 55 subscriber. As illustrated, each traffic volume container of any S-CDRs opened during a data session are limited to data counts accumulated for a single routing area. In the above example, only partial records created by the novel location-based partial record triggers of the present invention are illustrated. It is understood that by implementing other tariff triggers, a S-CDR may accordingly have more than one traffic volume container. Generation of partial records of S-CDRs having more than one traffic volume containers and the subsequent resetting of the traffic volume containers are carried out according to the general procedures described above with reference to S-CDRs having a single traffic volume container.

Thus, the present invention enables a mobile telecommunication system 200 operator the ability to impose system usage fees based on data traffic volume transfers on a mobile terminal subscriber dependent on the location within the mobile telecommunication system 200 from where the data traffic services were obtained. The invention described herein requires no infrastructure modifications to the mobile telecommunication system 200 and provides flexibility to network operators when choosing billing strategies to be levied on network subscriptions.

The exemplary mobile telecommunication system has been described according to the general infrastructure and nomenclature of the Global System for Mobile communications (GSM) standards although the present invention is not limited to application in such a system but was only chosen for facilitating discussion of the invention. For example, the present invention may just as effectively be implemented on a Universal Mobile Telecommunications System (UMTS). Furthermore, the attach procedures described herein have been described, in general, in relation to packet data protocol packet attach procedures. The packet data protocol attach procedures for accessing GPRS in a GSM architecture require a GPRS operable mobile terminal. However, the present invention is not limited to such attach procedures and the descriptions thereof are only intended to be illustrative. For example, non-GPRS mobile terminals could be accommodated by accessing a data network implementing the present invention by IMSI attach procedures as is understood in the art.

Although one or more embodiments of the method and apparatus of the present invention has been illustrated in the accompanying drawings and described above, it will be understood that the invention is not limited to the embodiments disclosed, but is capable of numerous rearrangements, modifications and substitutions without departing from the spirit of the invention as set forth and defined by the following claims.

What is claimed is:

1. A method of performing location-based traffic volume recording in a mobile telecommunication system, the method comprising the steps of:
    attaching a mobile terminal, in a first routing area of a first location area of the mobile telecommunication system, to the mobile telecommunication system;
    opening a mobility call detail record in a service node of the mobile telecommunication system, the service node operable to provide a data service to the mobile terminal in the first location area;
    opening a first location container in the mobility call detail record;
    activating the mobile terminal, the mobile terminal operable to transfer data on an uplink to the mobile telecommunication system and receive data on a downlink from the mobile telecommunication system;
    opening a service node call detail record in the service node of the mobile telecommunication system;
    opening a first traffic volume container in the service node call detail record for storing a traffic volume count of data transfers;
    closing the first location container in response to the mobile terminal moving into a second routing area of the mobile telecommunication system; and
    generating a partial record of the service node call detail record in response to closure of the first location container.

2. The method according to claim 1, further including the step of resetting the traffic volume count after the step of generating a partial record.

3. The method according to claim 1, wherein the traffic volume count includes an uplink volume count of data transferred from the mobile terminal to the service node and a downlink volume count of data transferred to the mobile terminal from the service node.

4. The method according to claim 1, wherein the data is data delivered by a data network accessed by the mobile terminal through the mobile telecommunication system.

5. The method according to claim 4, wherein the data network is a packet data network.

6. The method according to claim 5, wherein the service node is a serving general packet radio service support node.

7. The method according to claim 5, wherein the service node provides data service to the mobile terminal in the first routing area and the second routing area.

8. The method according to claim 5, wherein the mobile terminal is a general packet radio service operable mobile terminal.

9. The method according to claim 5, wherein the mobile telecommunication system is a global system for mobile communication system.

10. The method according to claim 1 wherein the second routing area is included in the first location area, the method further comprising the following steps:
    opening a second location container upon closing of the first location container; and
    accumulating subsequent traffic volume counts in the reset traffic volume container.

11. The method according to claim 1, wherein the mobility call detail record includes a subscriber identifier component that includes an identification of the mobile terminal.

12. The method according to claim 1, wherein the service node call detail record includes a subscriber identifier component that includes an identification of the mobile terminal.

13. The method according to claim 1, wherein the service node call detail record includes a record sequence number, the record sequence number being incremented after the partial record is generated.

14. The method according to claim 1 wherein the second routing area is included in a second location area of the mobile telecommunication system, further comprising the steps of:
    closing the mobility call detail record; and
    closing the service node call detail record, the service node being inoperable to provide a data service to the mobile terminal in the second location area.

15. The mobile telecommunication system for providing a data service to a mobile terminal therein, the mobile telecommunication system comprising:
    a plurality of base transceiver stations having a first subset thereof included in a first routing area and a second subset thereof included in a second routing area; and a service node operable to provide a data service to the mobile terminal located within one of the first and second routing areas, the service node opening a mobility call detail record and a location container in the mobility call detail record in response to the mobile terminal attaching to the mobile telecommunication system, the service node opening, in response to the mobile terminal activating, a service node call detail record and a traffic volume container operable to record a count of data traffic volume to and from the mobile terminal, the location container being closed in response to the mobile terminal moving from the first routing area to the second routing area, a partial record of the service node call detail record being created in response to closure of the location container, the count recorded in the traffic volume container being reset after creation of the partial record.

16. The mobile telecommunication system according to claim 15, wherein the count includes an uplink volume count of data transferred from the mobile terminal to the service node and a downlink volume count of data transferred to the mobile terminal from the service node.

17. The mobile telecommunication system according to claim 15, wherein the service node opens a second location container upon closure of the first location container, subsequent data transfers being counted in the reset traffic volume container.

18. The mobile telecommunication system according to claim 15, wherein the plurality of base transceiver stations further includes a third subset in a third routing area, the service node inoperable to provide a data service to the mobile terminal in the third routing area, the service node closing the mobility call detail record and the service node call detail record in response to the mobile terminal migrating into the third routing area.

19. The mobile telecommunication system according to claim 15, wherein the data service is a general packet radio service and the mobile terminal is a general packet radio service operable mobile terminal.

20. The mobile telecommunication system according to claim 19, further including a gateway general packet radio service support node, and the service node is a serving general packet radio service support node and interfaces with the gateway general packet radio service support node.

21. A service node for providing a data service to a mobile terminal in a mobile telecommunication system, comprising:
a communication interface with a base station subsystem for transferring data between the base station controller and the service node; and
a communication interface with a data network, the service node opening, in response to the mobile terminal attaching to the mobile telecommunication system, a mobility call detail record and a location container therein for recording a geographic area in which the mobile terminal is located within the mobile telecommunication system, the service node opening, in response to the mobile terminal activating, a service node call detail record and a traffic volume container therein for recording a traffic volume count of data delivered to and from the mobile terminal, the location container being closed in response to the mobile terminal moving from the geographic area, the service node generating a partial record of the service node call detail record in response to closure of the location container, the count in the traffic volume container being reset after generation of the partial record.

22. The service node according to claim 21, wherein the geographic area is one of a plurality of geographic areas in which the service node provides data service.

23. The service node according to claim 21, wherein the service node closes the location container when the mobile terminal leaves the geographic area.

24. The service node according to claim 22, wherein the service node opens a second location container in response to the mobile terminal entering a second geographic area included in the plurality of geographic areas, subsequent data transfers being counted in the reset traffic volume container.

25. The service node according to claim 21, wherein the traffic volume count includes an uplink count that includes a count indicating the amount of data transferred from the mobile terminal to the service node and a downlink count that includes a count indicating the amount of data transferred from the service node to the mobile terminal.

26. The service node according to claim 21, wherein the data service is a general packet radio service.

27. The service node according to claim 26, wherein the data network is a packet data network.

28. The service node according to claim 26, wherein the service node is a serving general packet radio services support node.

29. The service node according to claim 21, wherein the mobile telecommunication system is a global system for mobile communications telecommunication network.

30. The service node according to claim 21, wherein the location container is included in a mobility call detail record that is opened when the mobile terminal attaches to the mobile telecommunication system.

31. The service node according to claim 21, wherein the traffic volume container is included in a service node call detail record opened when the mobile terminal activates with the data network.

32. A plurality of call detail records for recording a traffic volume count of data transferred between a mobile terminal and a mobile telecommunication system through a node of a network, the call detail records comprising:
a mobility call detail record containing a location container configured to open in response to the mobile terminal attaching to the mobile telecommunication system in a first geographic location of the network and remain open until the mobile terminal leaves the first geographic location, wherein the mobility call detail record includes an identifier component that stores an identifier of the mobile terminal within the network; and
a service node call detail record containing a traffic volume container configured to open in response to the mobile terminal activating and operable to store a count of a volume of data passed through the node of the network, the traffic volume container operable to increment the count of the volume of data transferred through the node of the network, a partial record of the service node call detail record being generated when the mobile terminal migrates from the first geographic location to a second geographic location in the network and the location container is closed, the count recorded in the traffic volume container being reset upon generation of the partial record.

33. The call detail record according to claim 32, wherein the count includes an uplink count of data transferred from the device and a downlink count of data transferred to the device.

34. The call detail record according to claim 32, wherein the first geographic location is in a first routing are and the second geographic location is in a second routing area in the network.

35. The call detail record according to claim 32, wherein, in response to the migration, a location container recording a geographic location of the device closes, generation of the partial record of the call detail record occurring in response to the closure of the location container.

* * * * *